Jan. 13, 1953  P. MORRIS  2,624,951
PLOTTING DEVICE
Filed May 21, 1951
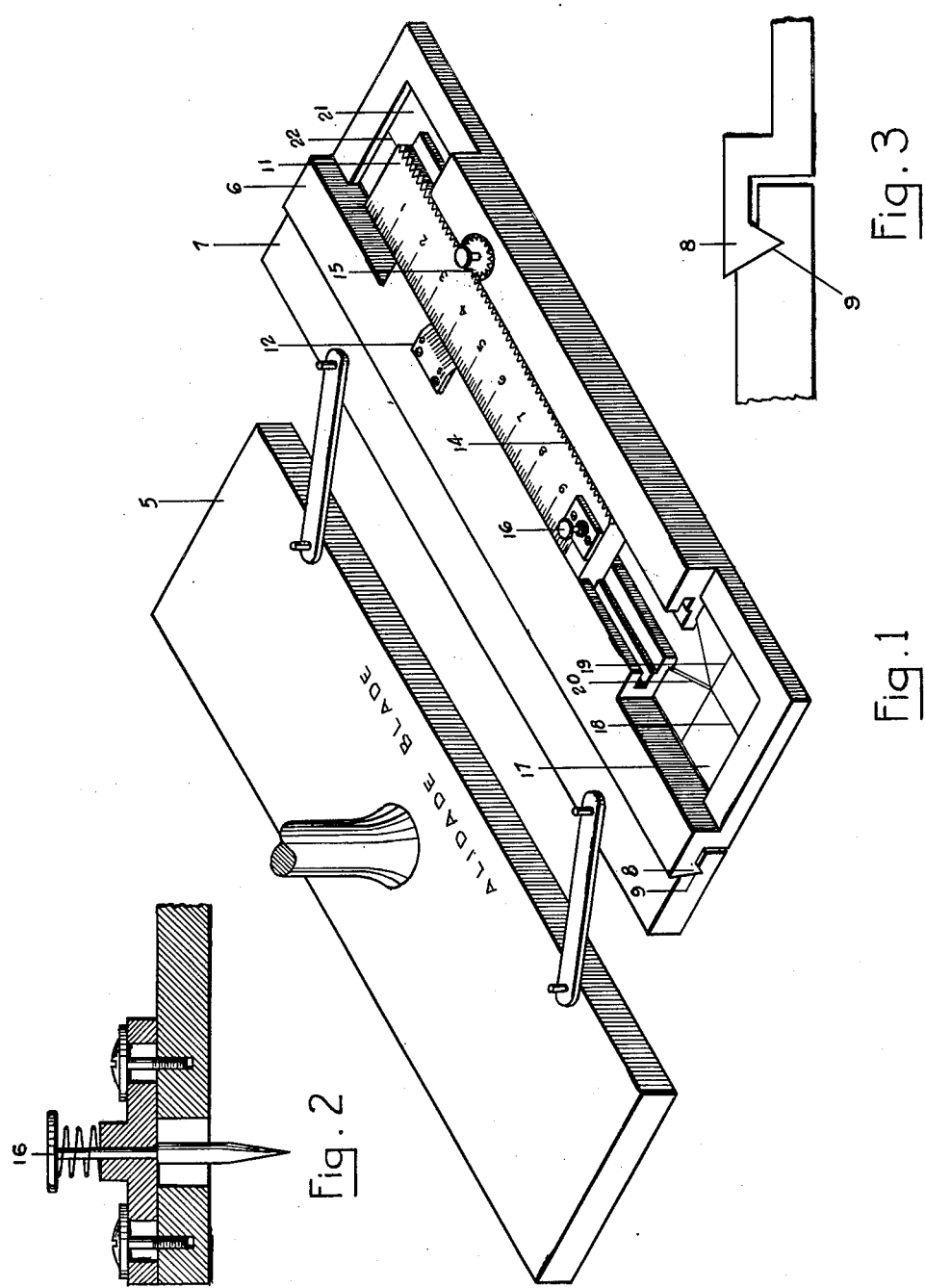
Paul Morris  INVENTOR.
BY Bentley C. Morrow
Attorney Patented Jan. 13, 1953

2,624,951

UNITED STATES PATENT OFFICE 2,624,951

PLOTTING DEVICE

Paul Morris, Chattanooga, Tenn., assignor to the Tennessee Valley Authority, a corporation of the United States Application May 21, 1951, Serial No. 227,499

1 Claim. (Cl. 33—189)

(Granted under Title 35, U. S. Code (1952), sec. 266)

The invention herein described may be manufactured and used by or for the Government for governmental purposes without payment to me of any royalty thereon.

This invention relates to improvements in instruments for surveying and drafting, and more particularly to rapid means for scaling and plotting distances accurately in plane-table work.

Plane-table mapping is widely used by many governmental departments because more topographical work can be done in less time by its use than by any other method except phototopography. Its use also makes it easy to eliminate errors in azimuth, and more complete work can be done by making the drawing in the field than by plotting from field notes in an office.

In plane-table survey work, map measurements are made directly on the drawing in the field as the work progresses, often under very unfavorable conditions. At present, for precise work, the topographer must place his telescopic alidade on a map drawing on the plane table so that an edge of the blade of the alidade touches the point on the map which represents the station occupied by the topographer. He then draws a line along the edge of the alidade blade on the map from the station occupied toward a forward ground station. This requires some trial-and-error movement of the instrument, resulting in some scour on the map drawing, and may consume considerable time depending upon the skill of the operator.

The operator then moves the instrument from the line drawn so that he can begin scaling and plotting work. He next places an engineer's scale so that the zero point on the scale coincides with that point on the map indicating the station occupied. He then plots the correct distance on the line by pricking a fine point in the map with a needle along the edge of the scale at the proper point. At present, scaling and plotting map distances to the nearest 0.02 of an inch, or closer, is a tedious job requiring good eyesight, a steady hand, and comfortable working conditions. During cold weather or immediately following a strenuous climb it is very difficult for the topographer to achieve sufficient steadiness of hand to avoid making accurate plotting a slow and tedious job.

It is an object of this invention to provide a device for speedy and precise scaling and plotting distance measurements on a flat surface.

Another object is to provide such device which greatly reduces the need for good eyesight, steady hands, and delicate touch.

Another object is to provide a device for plane-table mapping which reduces scour upon map drawings.

Other objects and advantages will become apparent as this disclosure proceeds.

I have found that these objects are attained in a device which comprises in combination a parallel rule, one blade of which is preferably the base blade of an alidade or the blade of a drafting machine; a longitudinally movable graduated slide assembly, having a median sliding part and an open bottom disposed parallel to one blade of said parallel rule and slideably attached thereto; a zero-point index disposed adjacent to one end of said slide assembly; and a vertically movable means for marking attached to said median sliding part in position to coincide with said zero-point index when the slide assembly is set at zero.

In the attached drawings, Figure 1 illustrates in perspective one type of device embodying principles of my invention; Figure 2 is a detail in vertical section of one satisfactory means for marking used therein; and Figure 3 illustrates one suitable means for attaching slideably the slide rule assembly of Figure 1 to a blade of a parallel rule shown therein.

In Figure 1 the reference numeral 5 indicates one blade of a parallel rule. Blade 5 is preferably the base blade of an alidade or a blade of a drafting machine. A slide assembly 6 is slideably attached to the other blade 7 of the parallel rule by means of a tongue 8 of the slide assembly 6 slideably disposed within a sutable groove 9 in blade 7 as is shown most clearly in Figure 3. The entire slide assembly thus is movable longitudinally in a course parallel to that of blades 5 and 7. The slide assembly has a median slide rule 11 which is graduated to any scale desired and the assembly has a longitudinal opening through the bottom below part 11. A graduated vernier 12 is disposed upon a suitable stationary part of slide assembly 6 to cooperate with graduations on slide rule 11. A toothed rack 14 is disposed upon slide rule 11 to cooperate with a manually operable pinion 15 for accurately moving and setting slide rule 11. A means for marking, which is preferably a vertically movable needle 16 as shown in detail in Figure 2, is attached to and extends through slide rule 11 adjacent to an end thereof opposite to the zero point of the graduated scale.

A transparent window 17, preferably made of some nonshatterable material such as "Plexiglas," is set into slide assembly 6 flush with the bottom thereof adjacent to an end nearest needle 16. Two lines 18 and 19 are etched upon this window, line 18 being parallel to the edges of the parallel rule and line 19 being perpendicular to line 18. A V-shaped notch 20 is cut out of this window and ends at the intersection of lines 18 and 19. Needle 16 is carried by slide rule 11 in position so that the needle point when depressed touches the point of notch 20 at the intersection of lines 18 and 19 when the zero point of the graduation on slide rule 11 is exactly opposite the zero point of vernier 12. The intersection of lines 18 and 19 and the point of notch 20 thus form a zero-point index. A transparent window 21, similar to window 17, is preferably provided in slide assembly 6 opposite to window 17 for convenience in positioning needle 16 upon a line. Window 21 has a single etched line which is a projection of line 18.

In operation, when the device is used in plane-table mapping, it is not desirable to set the alidade upon the exact spot which represents the position of the topographer. The instrument is set so that the point representing the topographer's position is approximately upon line 18 in window 17 behind the intersection of lines 18 and 19. A sight to a forward ground station is then taken through the telescope of the alidade, making such minor movements of the alidade as may be necessary. The distance on the scale corresponding to a measured distance from the topographer's position to the forward ground station is then set up on the scale by suitably moving slide rule 11. The parallel rule is then adjusted so that the point indicating the topographer's position lies exactly upon line 18. The entire slide assembly 6 is then moved backward along groove 9 until the intersection of lines 18 and 19 is exactly upon the point representing the topographer's position. The needle 16 is then pressed, thus pricking a point upon the map drawing representing the forward ground station.

The point thus is plotted without any noticeable scour occurring on the surface of the map drawing. The scaling and plotting of distances on flat surfaces by the use of this device are faster and more accurate and require less skill than is required by conventional methods. The need for normal eyesight and a steady hand is reduced considerably, thereby making it possible for topographers, map makers, draftsmen, and others whose work depends to a large extent on those faculties to continue doing satisfactory work after becoming somewhat handicapped by extremely cold weather, overexertion, uncomfortable position in relation to the drafting board or plane table, or other causes.

The operation of scaling and plotting is changed from one requiring comfortable position, good eyesight, steady hands, and a delicate touch to one requiring only eyesight good enough to index the zero point of a scale on a point on a drawing and the ability to read and set a vernier mechanically. The entire operation requires about the same qualities and skill as are employed in the setting and reading of values on a transit or other survey instrument.

Many modifications of the device shown are possible without departing from the spirit and scope of my invention, which is limited only by the subtended claim. For instance, the device may be equipped with suitable reading glasses at the zero-index point or over the vernier to be used for extremely accurate settings. Many different types of marking devices might be substituted for the needle 16. Various types of sliding attachments may be used instead of the tongue 8 and groove 9 shown and described. A capstan pin may be attached to slide rule 11 to permit rapid, rough setting of the instrument. The graduation shown on slide rule 11 may be transferred to a stationary part of slide assembly 6 and the vernier mounted on the slide if desired. A number of interchangeable slide rule 11 and verniers having different graduations may be provided, thus adapting the device to many types of plotting. One blade of the parallel rule may be a blade of a drafting machine instead of an alidade blade as illustrated, and the device will then be suitable for plotting distances in ordinary drafting work.

I claim as my invention:

A device of the class described which comprises in combination a parallel rule; a longitudinally movable graduated slide assembly, having a median sliding part and an open bottom, disposed parallel to one blade of said parallel rule and slideably attached thereto; a transparent window disposed flush with the bottom of said slide rule having a pointed notch therein; and a depressible needle carried by said median sliding part in position to touch a point of said notch when the median sliding part is set at zero.

PAUL MORRIS.

REFERENCES CITED

The following references are of record in the file of this patent:

FOREIGN PATENTS

| Number | Country | Date |
| --- | --- | --- |
| 126,225 | Switzerland | June 1, 1928 |